(12) United States Patent
Ahn et al.

(10) Patent No.: US 11,750,039 B2
(45) Date of Patent: Sep. 5, 2023

(54) WIRELESS POWER TRANSFER SYSTEM FOR SELECTIVELY DRIVING AT LEAST ONE TRANSMITTING COIL AMONG TRANSMITTING COILS AND OPERATION METHOD THEREOF

(71) Applicants: KOREA ADVANCED INSTITUTE OF SCIENCE AND TECHNOLOGY, Daejeon (KR); UNIVERSITY-INDUSTRY COOPERATION GROUP OF KYUNG HEE UNIVERSITY, Yongin-si (KR)

(72) Inventors: Seung Young Ahn, Daejeon (KR); Bom Son Lee, Yongin-si (KR); Jong Wook Kim, Daejeon (KR); Bum Jin Park, Daejeon (KR); Dong Ryul Park, Daejeon (KR); Sung Ryul Huh, Daejeon (KR)

(73) Assignees: KOREA ADVANCED INSTITUTE OF SCIENCE AND TECHNOLOGY, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 17/643,919

(22) Filed: Dec. 13, 2021

(65) Prior Publication Data
US 2022/0190648 A1  Jun. 16, 2022

(30) Foreign Application Priority Data
Dec. 14, 2020 (KR) .................. 10-2020-0174836

(51) Int. Cl.
*H02J 50/40* (2016.01)
*H02J 50/12* (2016.01)
(Continued)

(52) U.S. Cl.
CPC .............. *H02J 50/40* (2016.02); *H02J 50/10* (2016.02); *H02J 50/12* (2016.02); *H04B 5/0037* (2013.01); *H04B 5/0081* (2013.01)

(58) Field of Classification Search
None
See application file for complete search history.

(56) References Cited

U.S. PATENT DOCUMENTS

| 9,231,411 B2 | 1/2016 | Baarman et al. |
| 2014/0091626 A1* | 4/2014 | Walley ............... H02J 7/00047 307/104 |

(Continued)

FOREIGN PATENT DOCUMENTS

| KR | 10-1228556 B1 | 2/2013 |
| KR | 10-2017-0022420 A | 3/2017 |

(Continued)

OTHER PUBLICATIONS

Office Action dated Jul. 8, 2022 in Korean Application No. 10-2020-0174836.
(Continued)

*Primary Examiner* — Adi Amrany
(74) *Attorney, Agent, or Firm* — Sughrue Mion, PLLC

(57) ABSTRACT

Disclosed a wireless power transfer system configured to selectively drive at least one transmitting coil among transmitting coils that are included in a transmitter; and an operation method of the wireless power transfer system, and more particularly, to a technology of verifying a coupling coefficient between each of transmitting coils and a receiving coil when the receiving coil is located on the transmitting coils and selectively driving at least one transmitting coil among the transmitting coils based on the verified coupling coefficient. According to an embodiment of the present disclosure, the wireless power transfer system includes a transmitter including the transmitting coils; a receiver including a receiving coil configured to receive wireless power from at least one transmitting coil among the transmitting coils; and a controller configured to verify a coupling coefficient between each of the transmitting coil and
(Continued)

the receiving coil and selectively drive the at least one transmitting coil based on the verified coupling coefficient.

5 Claims, 8 Drawing Sheets

(51) Int. Cl.
*H04B 5/00* (2006.01)
*H02J 50/10* (2016.01)

(56) References Cited

U.S. PATENT DOCUMENTS

| | | | |
|---|---|---|---|
| 2014/0094116 A1* | 4/2014 | Walley | H02J 50/80 455/41.1 |
| 2016/0079766 A1* | 3/2016 | Jeong | H04L 25/4902 307/104 |
| 2019/0067992 A1* | 2/2019 | Liu | H02J 50/80 |
| 2020/0076233 A1* | 3/2020 | Bae | G06F 3/0395 |

FOREIGN PATENT DOCUMENTS

| | | |
|---|---|---|
| KR | 10-2018-0001783 A | 1/2018 |
| KR | 10-2018-0046018 A | 5/2018 |
| KR | 10-2019-0084127 A | 7/2019 |
| KR | 10-2020-0058808 A | 5/2020 |
| KR | 10-2020-0071514 A | 6/2020 |

OTHER PUBLICATIONS

Written Decision on Registration dated Nov. 3, 2022 from the Korean Intellectual Property Office in KR Application No. 10-2020-0174836.

* cited by examiner

600

ID="1"/>
WIRELESS POWER TRANSFER SYSTEM FOR SELECTIVELY DRIVING AT LEAST ONE TRANSMITTING COIL AMONG TRANSMITTING COILS AND OPERATION METHOD THEREOF

This research was supported by Institute of Information & communications Technology Planning & Evaluation (IITP) grant funded by the Korea government (MSIT) (No. 2020-0-00839, Development of Advanced Power and Signal EMC Technologies for Hyper-connected E-Vehicle).

The national research and development project related to this application is as follows.
  Project unique number: 1711116792
  Project number: 2020-0-00839
  Government department: Ministry of Science and ICT
  R&D management Agency: Institute of Information & communications Technology Planning & Evaluation
  R&D project: Broadcasting and Communication Industry Technology Development
  Research Project Title: Development of Advanced Power and Signal EMC Technologies for Hyper-connected E-Vehicle
  Contribution Ratio: 1/2
  Managing department: Korea Advanced Institute of Science and Technology
  Project period: 2020 Apr. 1-2027 Dec. 31

CROSS-REFERENCE TO RELATED APPLICATION

This application claims priority to Korean Patent Application No. 10-2020-0174836, filed on Dec. 14, 2020 in the Korean Intellectual Property Office, the disclosure of which is incorporated herein by reference.

BACKGROUND OF THE DISCLOSURE

Field of the Disclosure

The present disclosure relates to a wireless power transfer system configured to selectively drive at least one transmitting coil among transmitting coils that are included in a transmitter; and an operation method of the wireless power transfer system, and more particularly, to a technology of verifying a coupling coefficient between each of transmitting coils and a receiving coil when the receiving coil is located on the transmitting coils and selectively driving at least one transmitting coil among the transmitting coils based on the verified coupling coefficient.

Description of the Related Art

Recently, wireless power transfer (WPT) technology has been developed and commercialized in various fields such as portable electronic devices, medical devices, electric vehicles, and robots due to increase in convenience and stability by simplification of a charging structure.

In particular, in electric vehicles such as automated guided vehicles (AGVs) used in plants, automobiles, train industries, and the like, research on a wireless power transfer technology capable of delivering a large output of several kW to several tens of kW at high power transfer efficiency is underway.

To increase wireless power transfer efficiency of a magnetic resonance wireless power transfer system, it is necessary to increase a coil size or reduce an air gap to increase a coupling coefficient between coils of a transmitter Tx and coils of a receiver Rx.

In the case of a wireless power transfer system using magnetic coupling, the efficiency of the system increases as a coupling coefficient between coils of a transmitter and coils of a receiver increases.

In general, in a wireless power transfer system, efficiency is abruptly reduced when a receiver deviates from a transmitter area.

To address the problems, there is a need for a method of using a plurality of transmitter coils and selecting an optimal transmitting coil among the plural transmitting coils to selectively operate the coil according to the location of the receiver, thereby exhibiting high efficiency.

Conventionally, a method of operating all coils or a method of selecting only one specific coil regardless of the location of a receiver was used. However, when only one optimal transmitting coils is selected, higher efficiency is guaranteed, but the magnitude of leakage magnetic field adversely affecting the human body increases.

Existing wireless chargers have a one-to-one structure wherein power is transmitted from one transmitter to one receiver.

Recently, charging pads that can charge multiple products have been released. However, these pads have a structure wherein plural charging pads are bundled into one case.

To accommodate a wider charging range and simultaneously charge plural receivers, a large transmitting coil or a plurality of small transmitting coils should be used.

When a single large coil is used, magnetic field distribution is uneven so that power cannot be transmitted with high efficiency to all areas. When plural coils are used, transmitting coils should be differently operated depending upon the position of a receiving coil to achieve high efficiency.

When only one transmitting coil with the greatest influence according to the position of a receiving coil is selected to transmit power, high current flows through the single coil, so that the magnitude of power loss increases exponentially and a large amount of power cannot be transmitted due to the current limit of a conductor.

When the current of each transmitting coil is adjusted according to the position of a receiving coil, high efficiency can be anticipated, but there is a problem in that the price, complexity and volume of a power conversion system increase because the system should be respectively built to adjust current for each coil.

SUMMARY OF THE DISCLOSURE

Therefore, the present disclosure has been made in view of the above problems, and it is one object of the present disclosure to select an optimal transmitting coil based on coupling coefficients between transmitting coils and a receiving coil when a receiver including the receiving coil is located on a transmitter in which the transmitting coils are arranged.

It is another object of the present disclosure to deriving a criterion for selecting an optimal transmitting coil by mathematically analyzing efficiency and power transmitting efficiency when power is transmitted from the transmitter in which transmitting coils are arranged to the receiver.

It is still another object of the present disclosure to verify a coupling coefficient information between coils using a communication technology, an impedance analysis method and the like, and activate or deactivate at least one transmitting coil among the transmitting coils using the verified coupling coefficient information.

It is still another object of the present disclosure to eliminate power loss and leakage magnetic field generated from a coil having small influence when all transmitting coils are operated.

It is still another object of the present disclosure to increase maximum power capacity in preparation of the case where only one transmitting coil is selected and operated, and to reduce power loss by distributing current introduced into each coil to transmit the same power.

It is still another object of the present disclosure to selectively operate a transmitting coil only using relative coupling coefficient ratios between the transmitting coil and the receiving coil regardless of the number of operating coils, the size of transmitting coils, the size of a receiving coil, a load resistance, an operating frequency, etc., thereby being applied to various application fields of wireless power transfer.

It is yet another object of the present disclosure to control a current value, supplied to each transmitting coil, according to the position of the receiver, thereby being capable of addressing a problem of system price increase dependent upon current value, and problems associated with volume and complexity increase. In accordance with an aspect of the present invention, the above and other objects can be accomplished by the provision of a wireless power transfer system for selectively driving at least one transmitting coil among transmitting coils, including: a transmitter including the transmitting coils; a receiver including a receiving coil configured to receive wireless power from at least one transmitting coil among the transmitting coils; and a controller configured to verify a coupling coefficient between each of the transmitting coil and the receiving coil and selectively drive the at least one transmitting coil based on the verified coupling coefficient.

The controller may arrange the verified coupling coefficients in descending order and may determine a driving order of the transmitting coils based on the coupling coefficients arranged in the descending order.

The controller may selectively drive the at least one transmitting coil based on the verified coupling coefficients and an equation below:

$$k_m > \frac{\sqrt{m(m-1)} - (m-1)}{m-1}\left(\sum_{i=1}^{m-1} k_i\right)$$

The controller may determine a coupling coefficient of $k_i$ while determining a coupling coefficient of $k_m$ by substituting the order of the transmitting coil according to the determined driving order into m.

The controller may selectively drive a transmitting coil corresponding to m when a coupling coefficient ratio between the coupling coefficient of $k_m$ and the coupling coefficient of $k_i$ is greater than a value calculated by an equation below:

$$\frac{\sqrt{m(m-1)} - (m-1)}{m-1}$$

The controller may verify a coupling coefficient according to a position of a center of the receiving coil on the transmitting coils, may determine a driving order of the transmitting coils using the verified coupling coefficient, and may selectively drive at least one transmitting coil satisfying an equation below by substituting the order of the transmitting coils based on the determined driving order into the equation below:

$$k_m > \frac{\sqrt{m(m-1)} - (m-1)}{m-1}\left(\sum_{i=1}^{m-1} k_i\right)$$

In accordance with another aspect of the present invention, there is provided a method of operating a wireless power transfer system including a transmitter including transmitting coils; a receiver including a receiving coil configured to receive wireless power from at least one transmitting coil among the transmitting coils; and a controller configured to control operation of the transmitter and the receiver, the method including: verifying, by the controller, a coupling coefficient between each of the transmitting coils and the receiving coil; and selectively driving, by the controller, the at least one transmitting coil based on the verified coupling coefficient.

The method according to an embodiment of the present disclosure may further include arranging, by the controller, the verified coupling coefficients in descending order and determining a driving order of the transmitting coils based on the coupling coefficients arranged in the descending order.

The selectively driving may include selectively driving the at least one transmitting coil based on the verified coupling coefficient and an equation below:

$$k_m > \frac{\sqrt{m(m-1)} - (m-1)}{m-1}\left(\sum_{i=1}^{m-1} k_i\right)$$

The selectively driving may include: determining a coupling coefficient of $k_i$ while determining a coupling coefficient of $k_m$ by substituting the order of the transmitting coil according to the determined driving order into m; and selectively driving a transmitting coil corresponding to m when a coupling coefficient ratio between the coupling coefficient of $k_m$ and the coupling coefficient of $k_i$ is greater than a value calculated by an equation below:

$$\frac{\sqrt{m(m-1)} - (m-1)}{m-1}$$

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
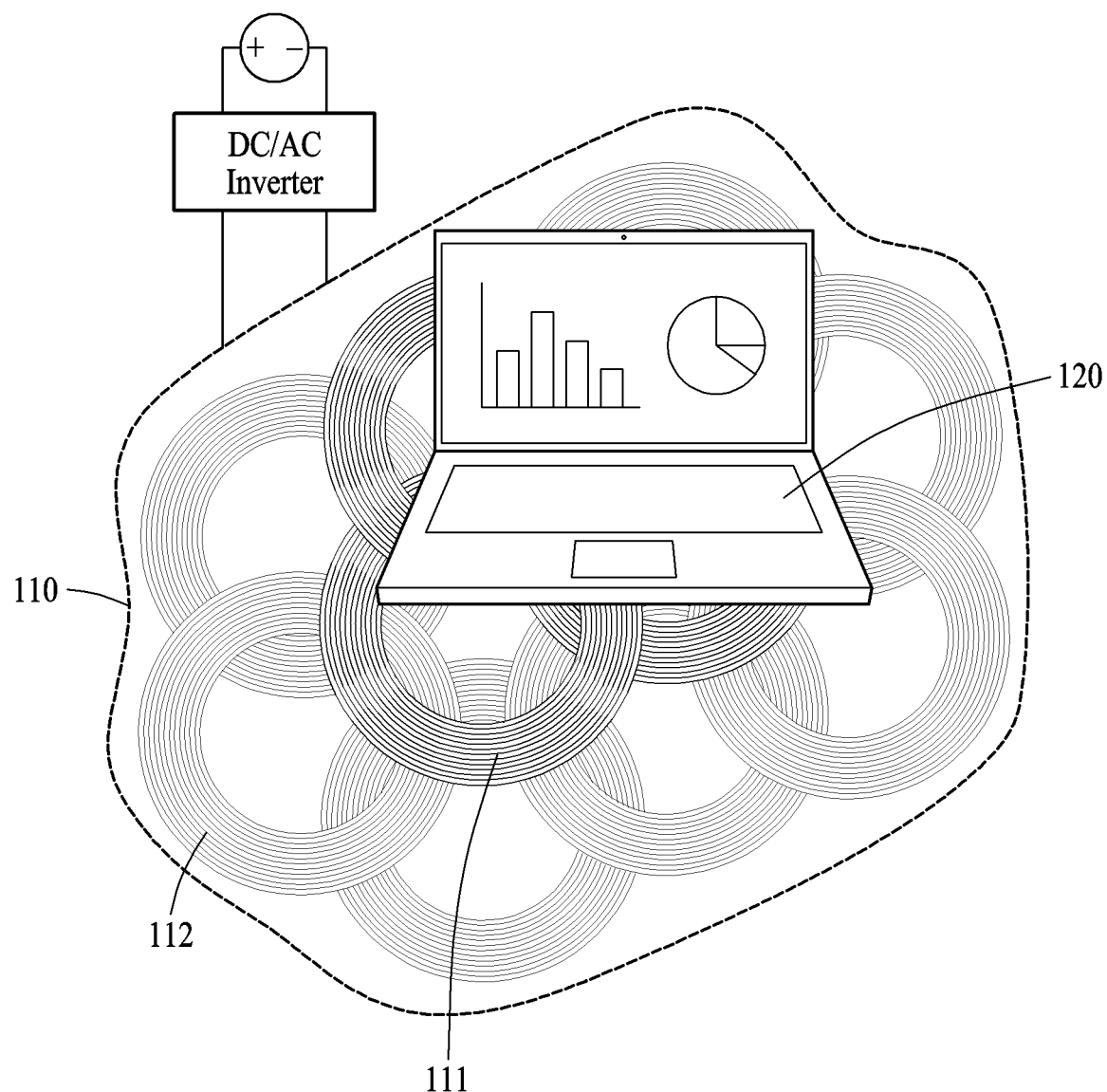
FIG. 1 illustrates a wireless charging pad to which a wireless power transfer system according to an embodiment of the present disclosure is applied.

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present disclosure.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the disclosure are shown. This disclosure may, however, be embodied in many different forms and should not be construed as limited to the exemplary embodiments set forth herein. Like reference numerals in the drawings denote like elements.

FIG. 1 illustrates a wireless charging pad to which a wireless power transfer system according to an embodiment of the present disclosure is applied.

FIG. 1 illustrates an embodiment wherein at least one transmitting coil among transmitting coils according to an embodiment of the present disclosure is selectively driven when a wireless charging pad includes transmitting coils and a charge object including a receiving coil is located on the transmitting coils.

Referring to FIG. 1, a wireless charging pad 110 of a wireless power transfer system 100 includes transmitting coils.

The transmitting coils include transmitting coils 111 activated under control of the wireless power transfer system 100; and inactivated transmitting coils 112.

Whether the transmitting coils are the transmitting coils 111 or the inactivated transmitting coils 112 may be determined according to the position of a center point of a receiving coil of a charge object 120.

When the charge object 120 is located on the wireless charging pad 110, the wireless power transfer system 100 according to an embodiment of the present disclosure may verify a coupling coefficient between transmitting coils included in the wireless charging pad 110 and a receiving coil of the charge object 120 and may select a transmitting coil to be activated among the transmitting coils based on the verified coupling coefficient.

For example, the wireless power transfer system 100 uses the communication technology and the impedance analysis technology to verify whether the charge object 120 is located on the wireless charging pad 110 and to verify a coupling coefficient between each of the transmitting coils of the wireless charging pad 110 and a receiving coil of the charge object 120.

According to an embodiment of the present disclosure, the wireless power transfer system 100 may determine activated transmitting coils 111 to be selectively driven among the transmitting coils by substituting each coupling coefficient for a selection criterion, and may selectively drive the same.

Here, the wireless power transfer system 100 selectively drives only transmitting coils that can have maximum efficiency.

An embodiment of, by the wireless power transfer system 100 according to an embodiment of the present disclosure, maximizing charging and wireless power transfer efficiency for the charge object 120 by selectively driving some transmitting coils among transmitting coils is described in detail with reference to FIGS. 2 to 7.

For example, when the wireless charging pad 110 is mass manufactured, the wireless power transfer system 100 may have optimal wireless charging efficiency also when the charge object 120 moves and is not located at an accurate position.

For example, the wireless charging pad 110 may be included in a transmitter, and the charge object 120 may be included in a receiver.

In addition, when a plurality of charge objects 120 is present, a transmitting coil selectively operates for each charge object, thereby being capable of providing the same charge efficiency for a plurality of charge objects located at different positions.

Accordingly, the wireless power transfer system 100 may support wireless charging of mobile devices, electric automobiles, and human implantable medical devices.

Further, the wireless power transfer system 100 partially performs wireless power transfer even if the wireless charging pad 110 is formed on the entire desk or cafe table, thereby being capable of implementing wireless charging technology with low power consumption while ensuring power charging efficiency.

Figure 2:
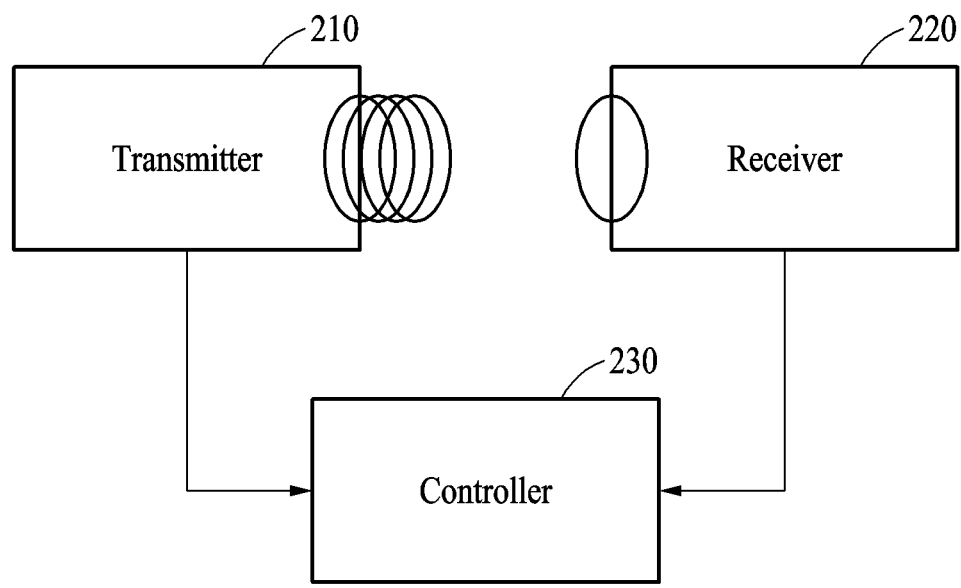
FIG. 2 illustrates a wireless power transfer system according to an embodiment of the present disclosure.

FIG. 2 illustrates a wireless power transfer system according to an embodiment of the present disclosure.

FIG. 2 illustrates components of the wireless power transfer system according to an embodiment of the present disclosure.

Referring to FIG. 2, the wireless power transfer system 200 according to an embodiment of the present disclosure includes a transmitter 210, a receiver 220 and a controller 230.

For example, the wireless power transfer system 200 may selectively drive at least one transmitting coil among transmitting coils to perform wireless power transfer.

According to an embodiment of the present disclosure, the transmitter 210 may include transmitting coils. Here, the transmitting coils are respectively located at different locations on a wireless charging pad, and the transmitting coils located at different locations may contact the center point of a receiving coil.

For example, the receiver 220 may include a receiving coil configured to receive wireless power from at least one transmitting coil among transmitting coils.

For example, the position of the center point of the receiving coil may be moved along the position of the receiver 220, and a coupling coefficient between the transmitting coil of the transmitter 210 and the receiving coil may be different according to the position of the center point.

According to an embodiment of the present disclosure, the controller 230 may control operations of the transmitter 210 and the receiver 220.

For example, the controller 230 may verify a coupling coefficient between each of the transmitting coils and the receiving coil, and may selectively drive at least one transmitting coil based on the verified coupling coefficient.

According to an embodiment of the present disclosure, the controller 230 may arrange the verified coupling coefficients in descending order, and may determine the driving order of the transmitting coils based on the coupling coefficients arranged in descending order.

For example, the controller 230 may determine the driving order of the transmitting coils in the order of increasing values of the verified coupling coefficient.

For example, the transmitting coils of the controller 230 may include first to fifth transmitting coils, and, when a coupling coefficient between the first transmitting coil and the receiving coil is a first integer, a coupling coefficient between the second transmitting coil and the receiving coil is a second integer, and the first integer is greater than the second integer, the driving order of the first transmitting coil corresponding to the first integer may be determined as a priority over the driving order of the second transmitting coil.

According to an embodiment of the present disclosure, the controller 230 selectively drives at least one transmitting coil among the transmitting coils based on Equation 1 below.

$$k_m > \frac{\sqrt{m(m-1)} - (m-1)}{m-1}\left(\sum_{i=1}^{m-1} k_i\right) \quad \text{[Equation 1]}$$

In Equation 1, $k_m$ may denote a coupling coefficient of an m-th transmitting coil, and m may denote the driving order determined for the transmitting coils.

Accordingly, the controller 230 may determine the coupling coefficient of $k_i$ while determining the coupling coefficient of $k_m$ by substituting the order of the transmitting coil according to the determined driving order for m.

More particularly, in a state in which n transmitting coils are included in the transmitter 210, the controller 230 determines m to be any number from 2 to n, and assigns 1 to a coil having the largest coupling coefficient between the transmitting coils and the receiving coil.

Accordingly, the magnitude of the coupling coefficient may indicate that $k_1$ is the largest, $k_2$ is the next largest, $k_3$ is the next largest, and $k_n$ is the smallest.

According to an embodiment of the present disclosure, the controller 230 drives a transmitting coil satisfying Equation 1, but does not drive a transmitting coil that does not satisfy Equation 1.

Accordingly, the controller 230 may determine Equation 1 as a selection criterion for a transmitting coil.

For example, the controller 230 may selectively drive a transmitting coil corresponding to m when a coupling coefficient ratio between the coupling coefficient of $k_m$ and the coupling coefficient of $k_i$ is larger than a value calculated by Equation 2 below. Here, Equation 2 is included in Equation 1.

$$\frac{\sqrt{m(m-1)} - (m-1)}{m-1} \quad \text{[Equation 2]}$$

In Equation 2, m may denote the driving order determined for transmitting coils.

For example, Equation 3 below may be derived when m in Equation 1 is 2, and Equation 4 below may be derived when m in Equation 1 is 3.

$$k_2 > \frac{\sqrt{2} - 1}{1} \cdot k_1 \quad \text{[Equation 3]}$$

In Equation 3, $k_2$ may denote the second largest coupling coefficient, and $k_1$ may denote the first largest coupling coefficient.

In the case of Equation 3, a transmitting coil corresponding to the second largest coupling coefficient may be selectively driven when a ratio of $k_2$ to $k_1$ is greater than 0.414.

$$k_3 > \frac{\sqrt{3 \cdot 2} - 2}{2} \cdot (k_1 + k_2) \quad \text{[Equation 4]}$$

In Equation 4, $k_3$ may denote the third largest coupling coefficient, $k_2$ may denote the second largest coupling coefficient, and $k_1$ may denote the largest coupling coefficient.

In the case of Equation 4, a transmitting coil corresponding to the second largest coupling coefficient may be selectively driven when a ratio of $k_3$ to the sum of $k_1$ and $k_2$ is greater than 0.225.

Changes in a coupling coefficient ratio and a reference value in relation to Equations 1 to 4 may be arranged in Table 1 below.

TABLE 1

| m | Coupling coefficient ratio | Reference value |
|---|---|---|
| 2 | $k_2/k_1$ | $\frac{(\sqrt{2 \times 1} - 1)}{1} = 0.414$ |
| 3 | $k_3/(k_1 + k_2)$ | $\frac{(\sqrt{3 \times 2} - 2)}{2} = 0.225$ |
| 4 | $k_4/(k_1 + k_2 + k_3)$ | $\frac{(\sqrt{4 \times 3} - 3)}{3} = 0.155$ |
| 5 | $k_5/(k_1 + k_2 + k_3 + k_4)$ | $\frac{(\sqrt{5 \times 4} - 4)}{4} = 0.118$ |
| n | $k_n/\Sigma_{i=1}^{n-1} k_i$ | $\frac{(\sqrt{n \times (n-1)} - (n-1))}{(n-1)}$ |

That is, the controller 230 may determine whether to operate a corresponding transmitting coil by comparing coupling coefficient ratios with reference values shown in Table 1.

According to an embodiment of the present disclosure, the controller 230 may verify a coupling coefficient according to a change in the center position of the receiving coil on the transmitting coils, may determine the driving order of the transmitting coils using the verified coupling coefficient, and may selectively drive at least one transmitting coil satisfying Equation 1 by substituting the order of the transmitting coil based on the determined driving order for Equation 1.

For example, the controller 230 may selectively drive the transmitting coils of the transmitter 210 according to a change in the position of the receiver 220.

Accordingly, when a receiver including a receiving coil is located on the transmitter of the present disclosure in which transmitting coils are arranged, an optimal transmitting coil may be selected based on coupling coefficients between the transmitting coils and the receiving coil.

In addition, the present disclosure may derive a criterion for selecting an optimal transmitting coil by mathematically analyzing efficiency and power transmitting efficiency when power is transmitted from the transmitter, in which transmitting coils are arranged, to a receiver.

Additionally, the present disclosure may verify coupling coefficient information between coils using a communication technology, an impedance analysis method, etc., and may activate or deactivate at least one transmitting coil among the transmitting coils using the verified coupling coefficient information.

Figure 3:
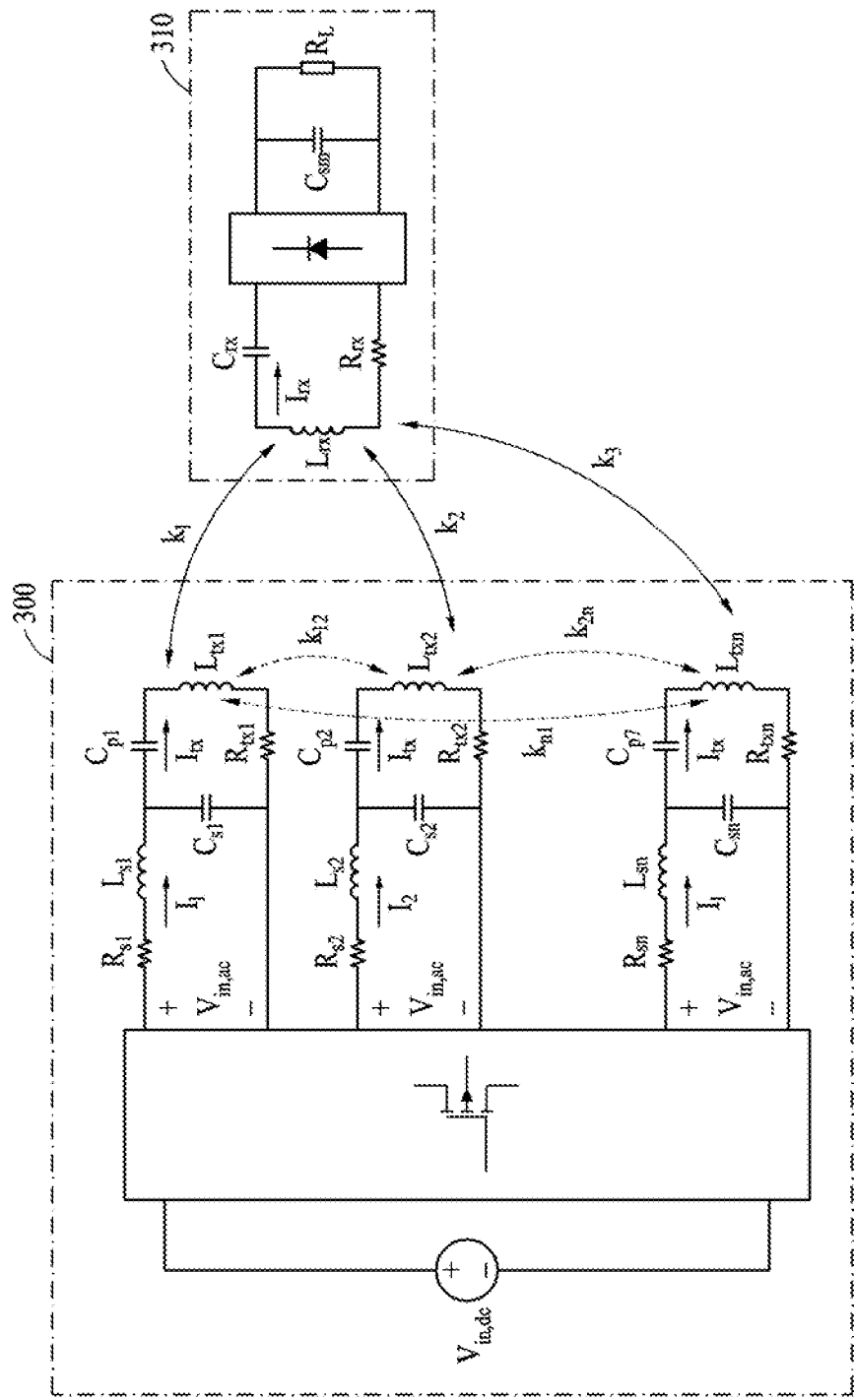
FIG. 3 illustrates an equivalent circuit of a wireless power transfer system according to an embodiment of the present disclosure.

FIG. 3 illustrates an equivalent circuit of a wireless power transfer system according to an embodiment of the present disclosure.

FIG. 3 illustrates parameters for determining a coupling coefficient based on the equivalent circuit of the wireless power transfer system according to an embodiment of the present disclosure.

Referring to FIG. 3, the wireless power transfer system includes a transmitter 300 and a receiver 310.

The transmitter 300 according to an embodiment of the present disclosure may include transmitting coils. The transmitting coils may transfer wireless power to a receiving coil of the receiver 310.

The transmitting coils of the transmitter 300 are composed of a first transmitting coil $tx_1$ to an n-th transmitting coil $tx_n$. That is, the number of the transmitting coils may be changed according to user's setting.

For example, the receiver 310 includes one receiving coil rx.

The transmitter 300 includes a DC-AC conversion system, and the receiver 310 includes an AC DC rectifier.

Each of the first transmitting coil $tx_1$ to the n-th transmitting coil $tx_n$ and the receiving coil rx form a coupling coefficient.

For example, parameters for verifying the coupling coefficient are as follows.

Ltxm may denote the inductance of an m-th transmitting coil, and m may denote 1 to n.

Lrx may denote the inductance of a receiving coil.

Crx may denote a compensation capacitor for sending large power at an operating frequency.

Rsm, Rtxm and Rrx may denote a parasitic resistance in each coil.

Lsm, Cpm and Csm may denote a compensation circuit of an m-th transmitter and may be a circuit for supplying a constant current to transmitting coils at an operating frequency.

km may denote a coupling coefficient between an m-th transmitting coil and a receiving coil, and kij may denote a coupling coefficient between an i-th transmitting coil and a j-th transmitting coil.

Csm may be a snubber capacitor for removing an AC component, and RL may denote a load resistance.

That is, the first transmitting coil $tx_1$ of the transmitter 300 may form a first coupling coefficient $k_1$ with the receiving coil rx of the receiver 310, a second transmitting coil $tx_2$ may form a second coupling coefficient $k_2$ with the receiving coil rx, and an n-th transmitting coil $tx_n$ may form an n-th coupling coefficient $k_n$ with the receiving coil rx.

Here, the first coupling coefficient $k_1$ to the n-th coupling coefficient $k_n$ may be verified by the controller.

Figure 4:
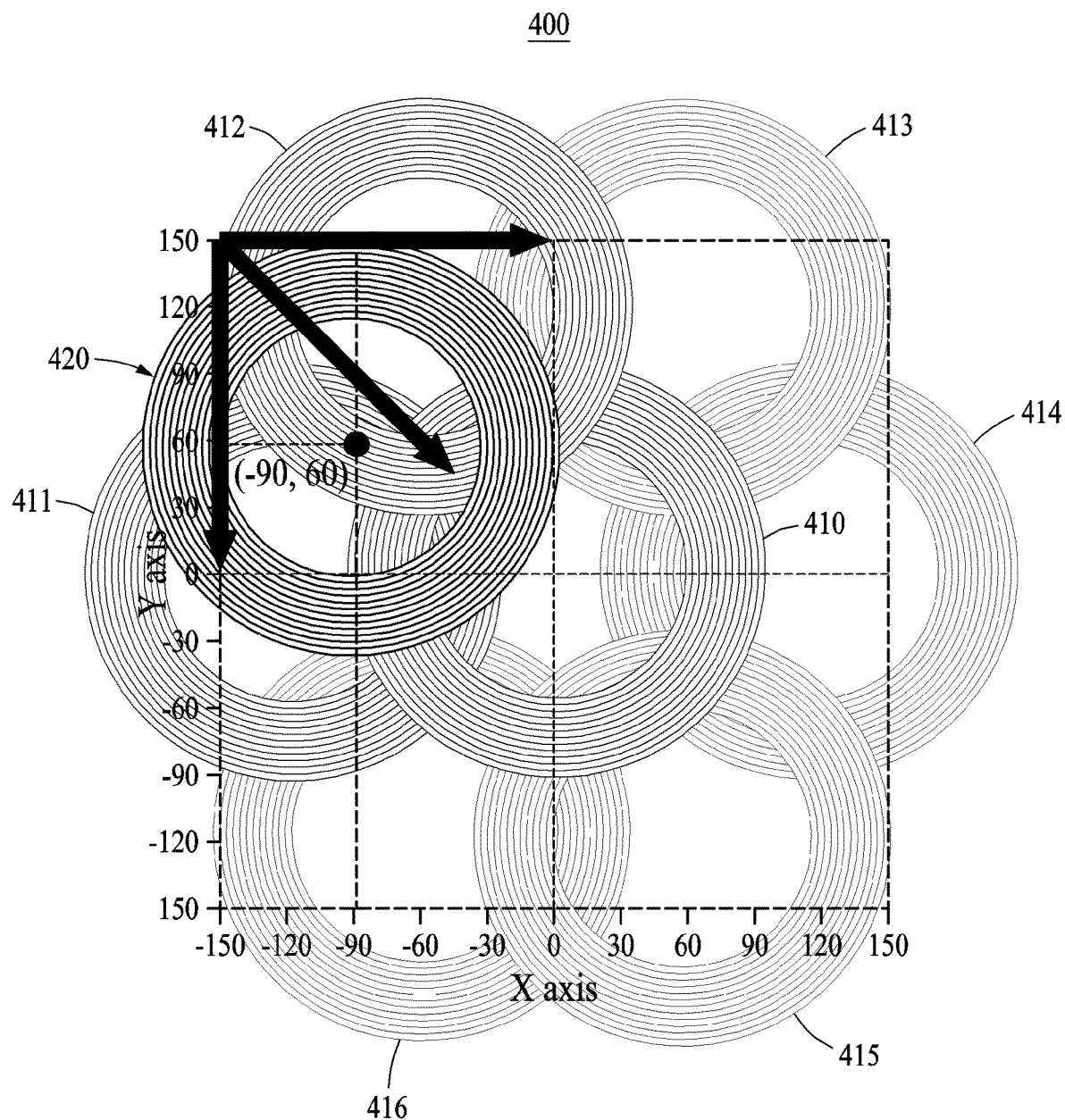
FIGS. 4 and 5 are diagrams for explaining a simulation of selecting a combination of transmitting coils exhibiting maximum efficiency using a wireless power transfer system according to an embodiment of the present disclosure.
Figure 5:
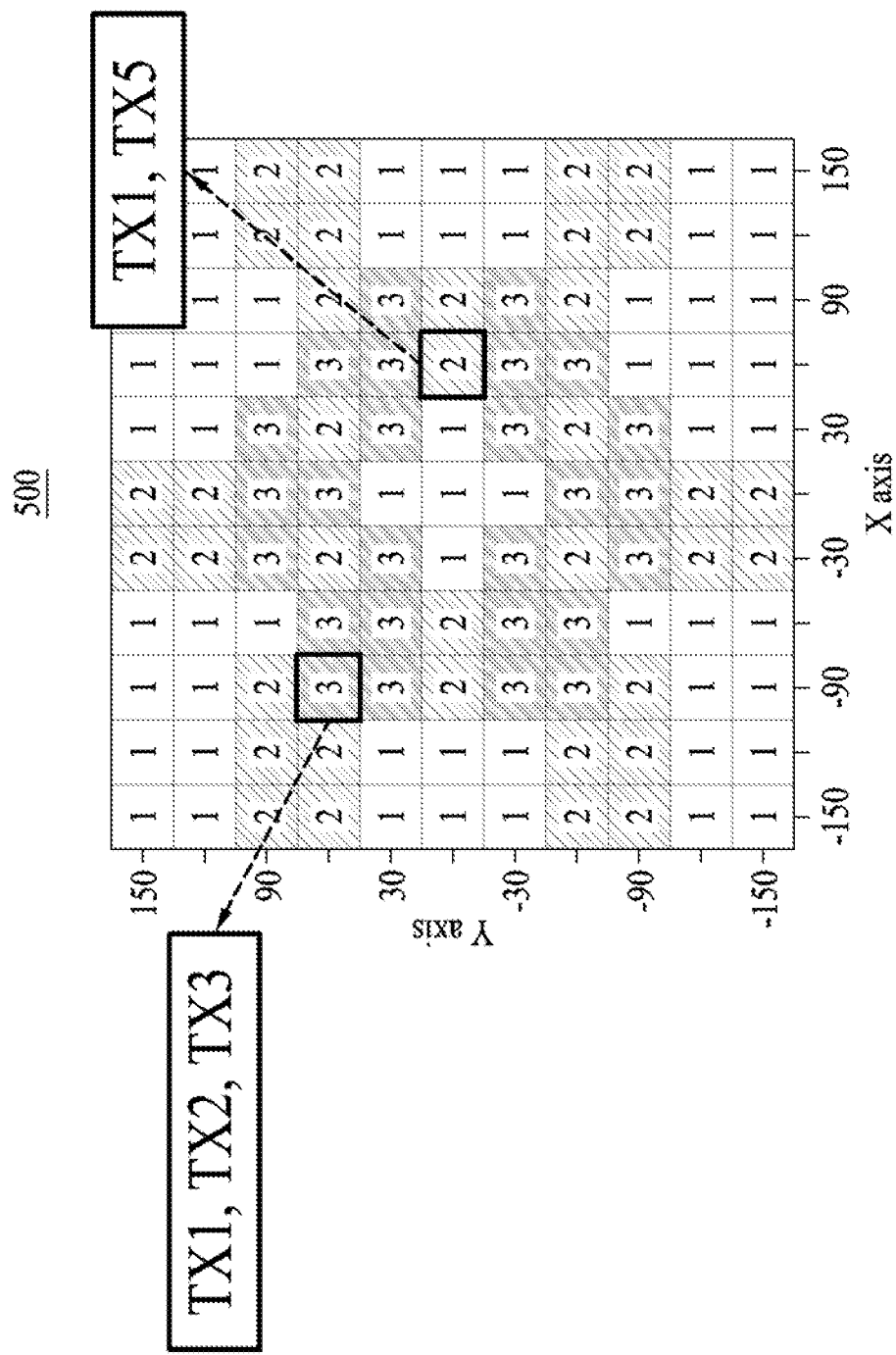

FIGS. 4 and 5 are diagrams for explaining a simulation of selecting a combination of transmitting coils exhibiting maximum efficiency using a wireless power transfer system according to an embodiment of the present disclosure.

FIGS. 4 and 5 explain a simulation of the case wherein the wireless power transfer system according to an embodiment of the present disclosure includes a transmitter including seven transmitting coils, and a receiver is located on the transmitter including seven transmitting coils.

Referring to FIG. 4, when a receiver including one coil moves along X and Y axes on a transmitter including first to seventh transmitting coils, transmitting coils selectively driven from among the first to seventh transmitting coils by a wireless power transfer system 400 according to an embodiment of the present disclosure are exemplified.

The transmitter according to an embodiment of the present disclosure includes a first transmitting coil 410, a second transmitting coil 411, a third transmitting coil 412, a fourth transmitting coil 413, a fifth transmitting coil 414, a sixth transmitting coil 415 and a seventh transmitting coil 416.

For example, the receiver includes a receiving coil 420.

According to movement of the center point of the receiving coil 420, coupling coefficients between the first transmitting coil 410 to the seventh transmitting coil 416 and the receiving coil 420 are changed, and transmitting coils to be driven among the first transmitting coil 410 to the seventh transmitting coil 416 are selectively changed.

For example, the wireless power transfer system 400 selectively drives the first transmitting coil 410, the second transmitting coil 411 and the third transmitting coil 412 when the center point of the receiving coil 420 is located at (−90, 60) on the X-axis and Y-axis coordinates.

Meanwhile, the wireless power transfer system 400 selectively drives the first transmitting coil 410 and the fifth transmitting coil 414 when the center point of the receiving coil 420 is located at (60, 0) on the X-axis and Y-axis coordinates.

Accordingly, the present disclosure can eliminate power loss and leakage magnetic field generated in a coil having small influence when all transmitting coils are operated.

In addition, the present disclosure can increase the maximum power capacity in preparation for the case where only one transmission coil is selected and operated, and can reduce power loss by distributing current introduced into each coil to transmit the same power.

FIG. 5 illustrates the number of transmitting coils selectively driven among seven transmitting coils according to the position of the center point of a receiving coil on the X-axis and Y-axis coordinates shown in FIG. 4.

Referring to FIG. 5, the wireless power transfer system selectively drives a first transmitting coil TX1, a second transmitting coil TX2 and a third transmitting coil TX3 when the center point of a receiving coil is located at (−90, 60) on the X-axis and Y-axis coordinates of the coordinates 500.

That is, the wireless power transfer system selectively drives three transmitting coils when the position of the center point of a receiving coil is located at (−90, 60) on the coordinates 500.

In addition, the wireless power transfer system selectively drives the first transmitting coil TX1 and a fifth transmitting coil TX5 when the position of the center point of a receiving coil is located at (60, 0) on the X-axis and Y-axis coordinates.

That is, the wireless power transfer system selectively drives two transmitting coils when the position of the center point of a receiving coil is located at (60, 0) on the coordinates 500.

Figure 6A:
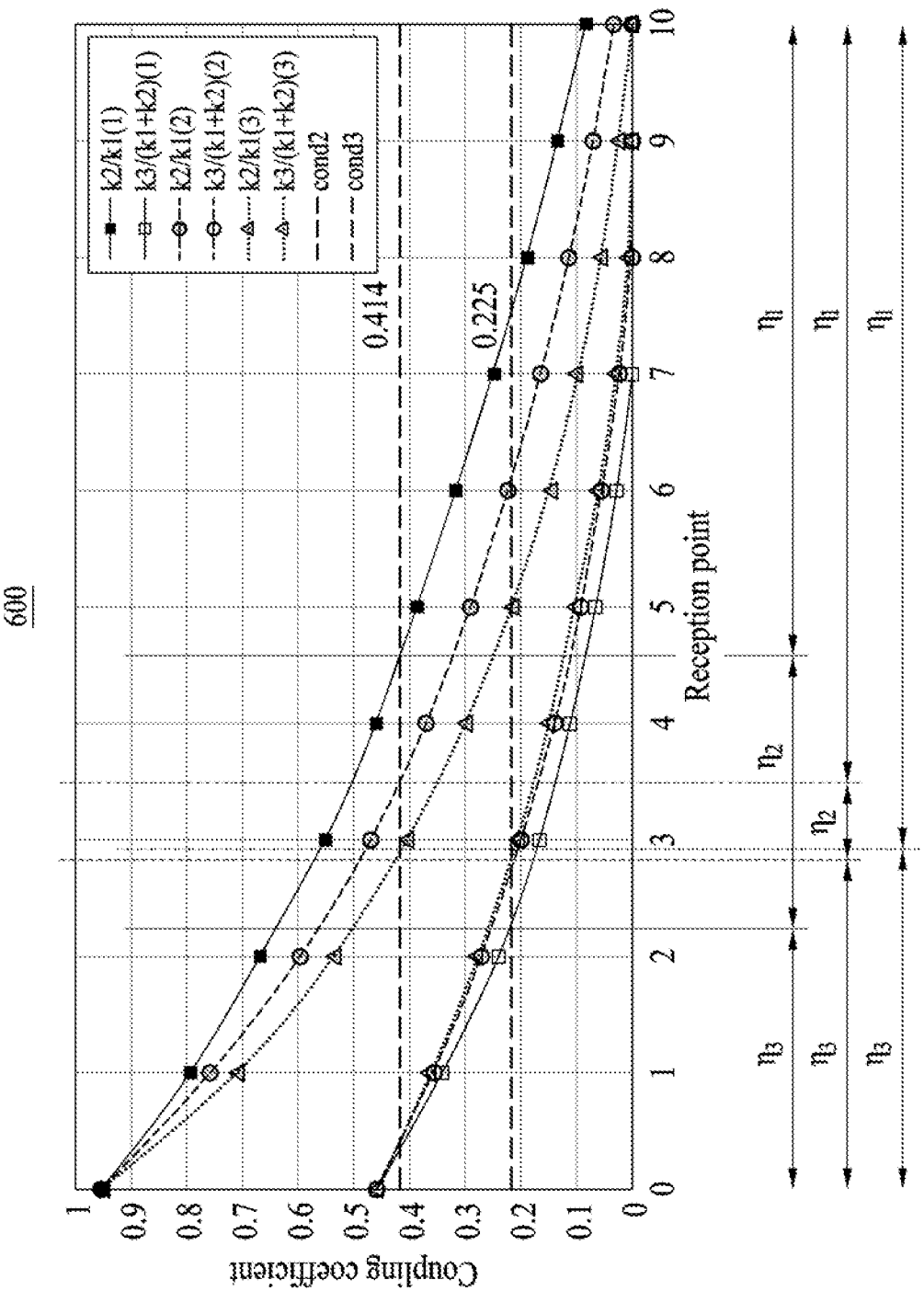
FIGS. 6A and 6B illustrate simulation results of selecting a combination of transmitting coils exhibiting maximum efficiency using a wireless power transfer system according to an embodiment of the present disclosure.
Figure 6B:
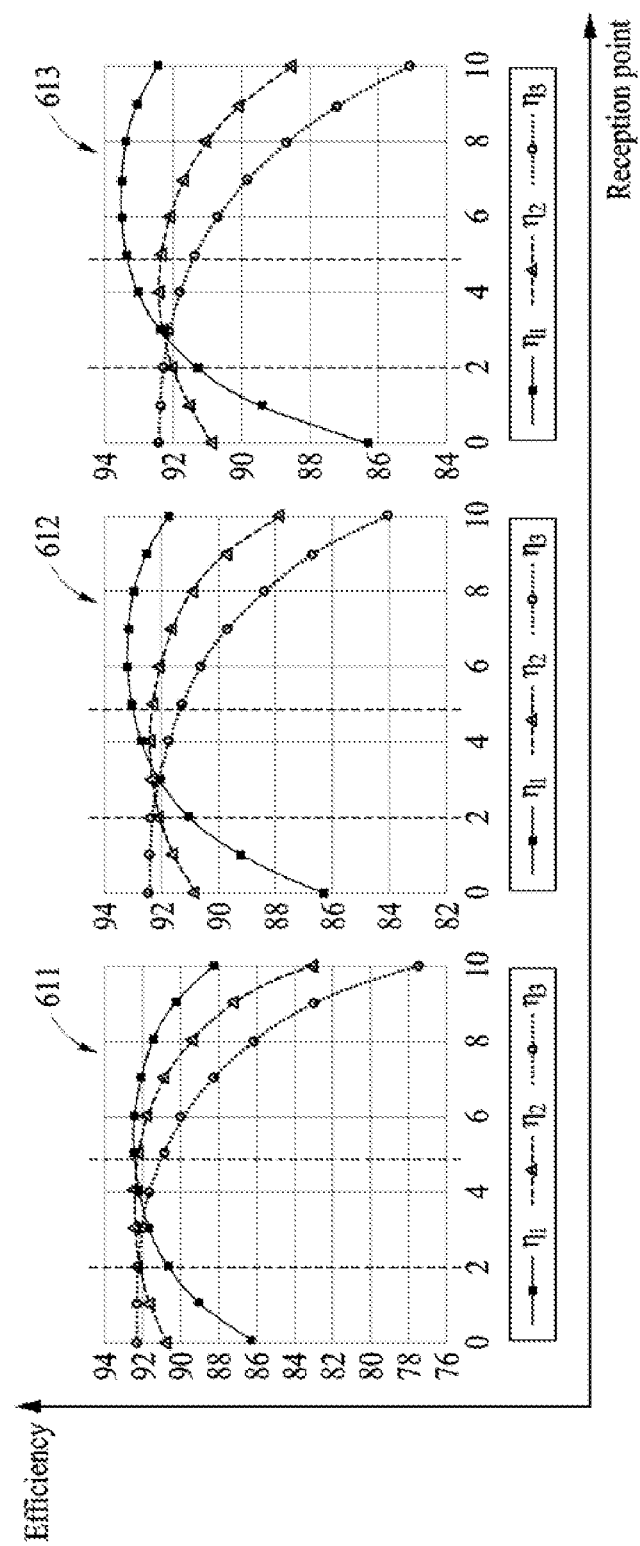

FIGS. 6A and 6B illustrate simulation results of selecting a combination of transmitting coils exhibiting maximum efficiency using a wireless power transfer system according to an embodiment of the present disclosure.

FIG. 6A illustrates coupling coefficients according to overlap of transmitting coils and a receiving coil according to an embodiment of the present disclosure.

Referring to a graph 600 of FIG. 6A, each of the transmitting coils and the receiving coil have an overlap of about 40 mm, and a coupling coefficient may be verified while respectively moving according to slopes along three paths between the transmitting coil and the receiving coil.

Here, each index of graph 600 may indicate a change in a coupling coefficient ratio, and a reception point may indicate a center point of the receiving coil.

In graph 600, a state ($\eta_1$), in which only the first transmitting coil having the largest coupling coefficient is activated, a state ($\eta_2$), in which only the first and second transmitting coils are activated, and a state ($\eta_3$), in which all transmitting coils are activated, are illustrated together.

FIG. 6B illustrates power efficiency for selection of a transmitting coil according to overlap of a transmitting coil and a receiving coil according to an embodiment of the present disclosure.

Referring to graph 610 of FIG. 6B, each of the transmitting coils and the receiving coil have an overlap of about 40 mm, a first slope 611, a second slope 612 and a third slope 613 are exemplified, and a state ($\eta_1$), in which only the first transmitting coil having the largest coupling coefficient is activated, a state ($\eta_2$), in which only the first and second transmitting coils are activated, and a state ($\eta_3$), in which all transmitting coils are activated, are illustrated together.

The first to third slopes 611 to 613 show that a transmitting coil should be selectively driven according to the position of each reception point.

Figure 7:
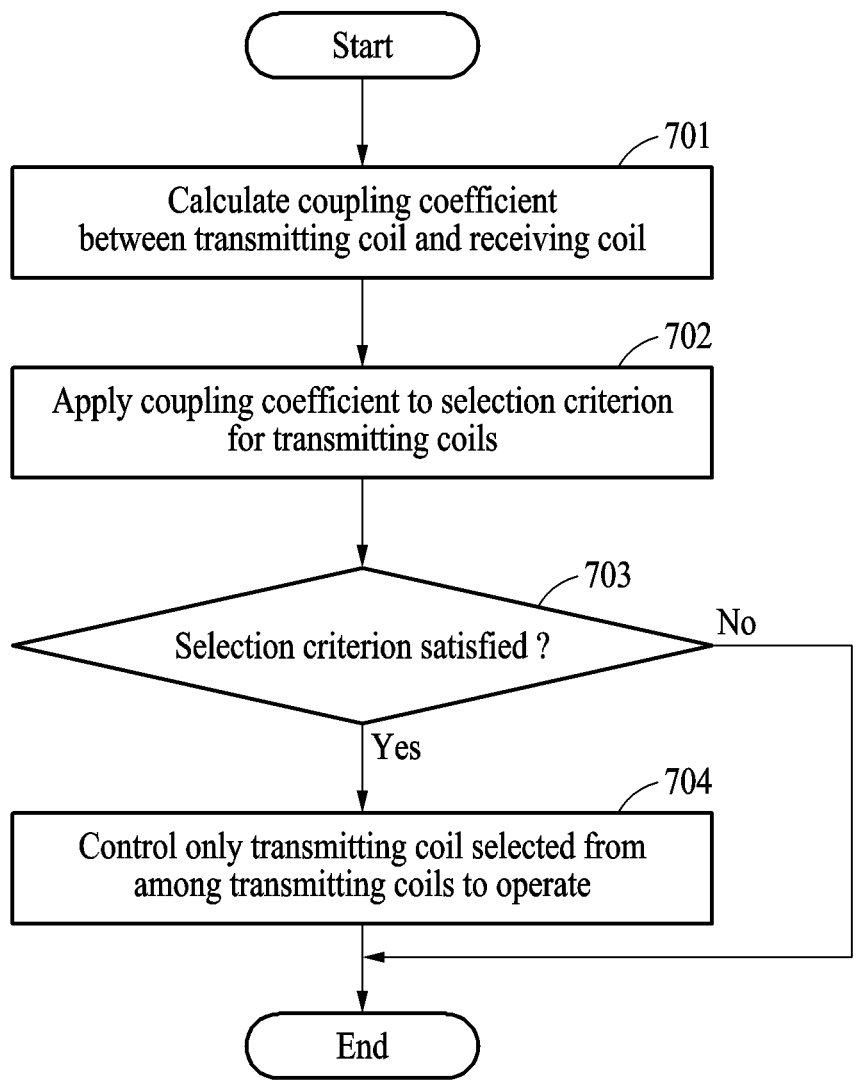
FIG. 7 illustrates an operation method of a wireless power transfer system according to an embodiment of the present disclosure.

FIG. 7 illustrates an operation method of a wireless power transfer system according to an embodiment of the present disclosure.

FIG. 7 illustrates an operation method of a wireless power transfer system according to an embodiment of the present disclosure which is capable of improving wireless power transfer efficiency by selectively driving at least one transmitting coil among transmitting coils due to inclusion of a transmitter including transmitting coils, a receiver including a receiving coil configured to receive wireless power from at least one transmitting coil among the transmitting coils, and a controller configured to control operation of the transmitter and the receiver.

Referring to FIG. 7, in step 701 of the operation method of the wireless power transfer system according to an embodiment of the present disclosure, a coupling coefficient between each of the transmitting coils and the receiving coil is verified.

That is, in the operation method of the wireless power transfer system, the coupling coefficient between each of the transmitting coils and the receiving coil is verified when the receiving coil is located on the transmitting coil.

In step 702 of the operation method of the wireless power transfer system according to an embodiment of the present disclosure, the coupling coefficient is applied to a selection criterion for the transmitting coils.

That is, the coupling coefficients verified in step 701 of the operation method of the wireless power transfer system are arranged in descending order, the driving order of the transmitting coils is determined based on the coupling coefficients arranged in descending order, and a selection criterion for the transmitting coils is applied by substituting the coupling coefficients verified according to the determined driving order into Equation 1.

In step 703 of the operation method of the wireless power transfer system according to an embodiment of the present disclosure, whether the coupling coefficient of the transmitting coil satisfies the selection criterion is determined.

That is, the coupling coefficient of $k_i$ is determined while determining the coupling coefficient of $k_m$ by substituting the order of the transmitting coil according to the driving order determined in step 702 of the operation method of the wireless power transfer system into Equation 1. Here, whether a coupling coefficient ratio between the coupling coefficient of $k_m$ and the coupling coefficient of $k_i$ satisfies Equation 2 is determined. Step 704 proceeds when satisfying the selection criterion, but the procedure is terminated when not satisfying the selection criterion.

Step 704 of the operation method of the wireless power transfer system according to an embodiment of the present disclosure controls only one transmitting coil selected from among the transmitting coils to operate.

That is, the operation method of the wireless power transfer system controls only the transmitting coil, which satisfies Equation 1 and corresponds to the selection criterion, to selectively operate, thereby transferring wireless power to the receiving coil.

Accordingly, the present disclosure can selectively operate transmitting coils only using relative coupling coefficient ratios between transmitting coils and a receiving coil regardless of the number of operating coils, the size of transmitting coils, the size of a receiving coil, a load resistance, an operating frequency, etc., thereby being applied to various application fields of wireless power transfer.

In addition, the present disclosure can control a current value, supplied to each transmitting coil, according to the position of the receiver, thereby being capable of addressing a problem of system price increase dependent upon current value, and problems associated with volume and complexity increase.

The present disclosure can select an optimal transmitting coil based on coupling coefficients between transmitting coils and a receiving coil when a receiver including the receiving coil is located on a transmitter in which the transmitting coils are arranged.

The present disclosure can derive a criterion for selecting an optimal transmitting coil by mathematically analyzing efficiency and power transmitting efficiency when power is transmitted from the transmitter in which transmitting coils are arranged to the receiver.

The present disclosure can verify a coupling coefficient information between coils using a communication technology, an impedance analysis method and the like, and activate or deactivate at least one transmitting coil among the transmitting coils using the verified coupling coefficient information.

The present disclosure can eliminate power loss and leakage magnetic field generated from a coil having small influence when all transmitting coils are operated.

The present disclosure can increase maximum power capacity in preparation of the case where only one transmitting coil is selected and operated, and to reduce power loss by distributing current introduced into each coil to transmit the same power.

The present disclosure can selectively operate a transmitting coil only using relative coupling coefficient ratios between the transmitting coil and the receiving coil regardless of the number of operating coils, the size of transmitting coils, the size of a receiving coil, a load resistance, an operating frequency, etc., thereby being applied to various application fields of wireless power transfer.

The present disclosure can control a current value, supplied to each transmitting coil, according to the position of the receiver, thereby being capable of addressing a problem of system price increase dependent upon current value, and problems associated with volume and complexity increase.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

[Description of Symbols]
200: wireless power transfer system
210: transmitter 220: receiver
230: controller

What is claimed is:

1. A wireless power transfer system for selectively driving at least one transmitting coil among transmitting coils, comprising:
- a transmitter comprising the transmitting coils;
- a receiver comprising a receiving coil configured to receive wireless power from at least one transmitting coil among the transmitting coils; and
- a controller configured to verify a coupling coefficient between each of the transmitting coil and the receiving coil and selectively drive the at least one transmitting coil based on the verified coupling coefficient,
- wherein the controller arranges the verified coupling coefficients in descending order and determines a driving order of the transmitting coils based on the coupling coefficients arranged in the descending order,
- wherein the controller selectively drives the at least one transmitting coil based on the verified coupling coefficients and an equation 1 below:

$$k_m > \frac{\sqrt{m(m-1)} - (m-1)}{m-1}\left(\sum_{i=1}^{m-1} k_i\right)$$

wherein the equation 1 comprises $k_m$ representing a coupling coefficient of an m-th transmitting coil, i representing "1", $k_i$ representing a coupling coefficient of an i-th transmitting coil and m representing the driving order determined for a plurality of transmitting orders and to be any number from 2 to n, and
wherein the controller determines a coupling coefficient of $k_i$ while determining a coupling coefficient of $k_m$ by substituting the order of the transmitting coil according to the determined driving order into m.

2. The wireless power transfer system according to claim 1, wherein the controller selectively drives a transmitting coil corresponding to m of $k_m$ when a coupling coefficient ratio between the coupling coefficient of $k_m$ and the coupling coefficient of $k_i$ is greater than a value calculated by an equation 2 below:

$$\frac{\sqrt{m(m-1)} - (m-1)}{m-1}$$

wherein the equation 2 comprises m representing an operating order determined for a plurality of transmitting orders and to be any number from 2 to n.

3. The wireless power transfer system according to claim 1, wherein the controller verifies a coupling coefficient according to a position of a center of the receiving coil on the transmitting coils, determines a driving order of the transmitting coils using the verified coupling coefficient, and selectively drives at least one transmitting coil satisfying an equation 1 below by substituting the order of the transmitting coils based on the determined driving order into the equation 1 below:

$$k_m > \frac{\sqrt{m(m-1)} - (m-1)}{m-1}\left(\sum_{i=1}^{m-1} k_i\right)$$

4. A method of operating a wireless power transfer system comprising a transmitter comprising transmitting coils; a receiver comprising a receiving coil configured to receive wireless power from at least one transmitting coil among the transmitting coils; and a controller configured to control operation of the transmitter and the receiver,
the method comprising:
- verifying, by the controller, a coupling coefficient between each of the transmitting coils and the receiving coil;
- arranging, by the controller, the verified coupling coefficients in descending order and determining a driving order of the transmitting coils based on the coupling coefficients arranged in the descending order; and
- selectively driving, by the controller, the at least one transmitting coil based on the verified coupling coefficient and an equation 1 below:

$$k_m > \frac{\sqrt{m(m-1)} - (m-1)}{m-1}\left(\sum_{i=1}^{m-1} k_i\right)$$

wherein the equation 1 comprises $k_m$ representing a coupling coefficient of an m-th transmitting coil, i representing "1", $k_i$ representing a coupling coefficient of an i-th transmitting coil and m representing the driving order determined for a plurality of transmitting orders and to be any number from 2 to n, and
wherein the selectively driving comprises:
determining a coupling coefficient of $k_i$ while determining a coupling coefficient of $k_m$ by substituting the order of the transmitting coil according to the determined driving order into m.

5. The method according to claim 4, wherein the selectively driving comprises:
selectively driving a transmitting coil corresponding to m when a coupling coefficient ratio between the coupling coefficient of $k_m$ and the coupling coefficient of $k_i$ is greater than a value calculated by an equation 2 below:

$$\frac{\sqrt{m(m-1)} - (m-1)}{m-1}$$

wherein the equation 2 comprises m representing an operating order determined for a plurality of transmitting orders and to be any number from 2 to n.

* * * * *